3,267,151
ETHERS OF HALOMETHYLATED DIPHENYL OXIDE

John Lawrence Pillepich, Midland, Mich., assignor to The Dow Chemical Company, Midland, Mich., a corporation of Delaware
No Drawing. Filed Mar. 22, 1961, Ser. No. 97,472
8 Claims. (Cl. 260—613)

This invention relates to certain reaction products of halomethyldiphenyl oxide and glycol and polyglycol monoethers and, more particularly, to novel compositions having the general formula:

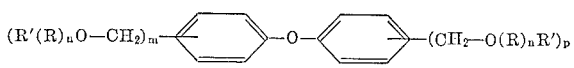

wherein R is any oxyalkylene structure having from two to four carbon atoms, R' is the phenyl radical or an alkyl radical having from one to four carbon atoms, $n$ is an integer from one to three, $m$ is an integer from one to two and $p$ is an integer from zero to two.

The reaction products of halomethylated diphenyl oxide, particularly chloromethyldiphenyl oxide and bromomethyldiphenyl oxide, and glycol and polyglycol monoethers may readily be prepared by slowly contacting halomethylated diphenyl oxide, dissolved in a suitable inert solvent such as chlorobenzene and the like. Generally, about a molar equivalent of such monoethers is employed for each halogen equivalent contained in said halomethylated diphenyl oxide together with a reaction temperature from about 50° C. to about 175° C. and a suitable alkali such as sodium and potassium hydroxides or carbonates. Preferably, about equimolar quantities of alkali and said monoethers are employed.

The reaction product is thereafter readily separated by decanting the reaction product from any subsisting aqueous layer and removing impurities, including remaining water, and inert solvent, if employed, by vaporization. Since the reaction is exothermic, it is desirable to control the rate of reaction by the rate of the addition of reactants and the amount of cooling applied to the reaction mixture. Agitation is normally employed to insure efficient contact of the reactants.

Reaction products formed as described above, for example, bis(α-(2-(2-ethoxyethoxy)ethoxy)-p-tolyl) ether, bis(α-(2-(2-butoxyethoxy)ethoxy)-p-tolyl) ether, bis(α-(2-(2-methoxyethoxy)ethoxy)-p-tolyl) ether, bis(α-(2-methoxyethoxy)-p-tolyl) ether, bis(α-(2-butoxyethoxy)-p-tolyl) ether, bis(α-(2-phenoxyethoxy)-p-tolyl) ether, and bis(α-(methoxypropoxypropoxypropoxy)-p-tolyl) ether, are highly useful as column liquid for vapor phase chromatography in both packed column and capillary techniques due to their solubility properties and thermal stability as well as relatively high boiling characteristics.

The following examples are given to illustrate the reaction products which may be prepared in accordance with the present invention as well as display the utility thereof, but are not to be construed as limiting the invention thereto.

Example 1

A three-liter, three-necked flask was equipped with an addition funnel, a mechanical stirrer and a reflux condenser. The flask was charged with 381 grams (5.0 moles) of ethylene glycol monomethyl ether and 132 grams of 85 percent potassium hydroxide. Two hundred sixty-seven grams (1.0 mole) of bis(α-(chloro-p-tolyl)) ether, dissolved in 300 milliliters of chlorobenzene, were added dropwise to the flask with agitation over a period of one hour while said flask was maintained at a temperature between about 90° C. and about 123° C. The reaction proceeded exothermically. To carry the reaction to completion, the reaction mixture, while being agitated, was allowed to rise gradually in temperature to about 123° C. Thereafter, the flask was cooled to room temperature and the organic layer was separated from any aqueous layer and then distilled under reduced pressure to isolate the reaction product, bis(α-(2-methoxyethoxy)-p-tolyl) ether, a clear liquid having boiling point of 196° C. at 0.1 millimeters pressure, a refractive index $(n/D)$ of 1.536 and an ebullioscopic molecular weight of 349.

Example 2

Following a procedure similar to the foregoing, various other reaction products of bis(α-chloro-p-tolyl) ether and glycol and polyglycol monoethers, such as 2-(2-ethoxyethoxy) ethanol, 2-(2-butoxyethoxy) ethanol, 2-butoxyethanol, 2-phenoxyethanol tripropylene glycol methyl ether, were prepared; physical properties of such prepared reaction products were obtained and identified as follows:

| Reaction Product | Refractive Index $(n/D)$ at 25° C. | Boiling Point at Indicated Pressure | |
|---|---|---|---|
| | | Deg. C. | Microns |
| Bis(α-(2-(2-ethoxyethoxy)ethoxy)-p-tolyl) ether | 1.5160 | 262 | 23 |
| Bis(α-(2-butoxyethoxy)ethoxy)-p-tolylether | 1.5065 | 282 | 40 |
| Bis(α-(2-(2-methoxyethoxy)ethoxy)-p-tolyl) ether | 1.5243 | 255 | 20 |
| Bis(α-(2-butoxyethoxy)-p-tolyl) ether | 1.5140 | 232 | 400 |
| Bis(α-(2-phenoxyethoxy)-p-tolyl) ether | 1.5620 | <291 | 25 |
| Bis(α-(methoxypropoxy-propoxy-propoxy)-p-tolyl) ether | 1.5040 | 190–206 | 10–12 |

In addition to the above-described reaction products, other compositions are prepared in a similar manner wherein the halomethylated diphenyl oxide is monohalomethyldiphenyl oxide, trihalomethyldiphenyl oxide, tetrahalomethyldiphenyl oxide and mixtures thereof.

Example 3

To demonstrate the utility of the subject reaction products, 0.01 milliliter of a liquid mixture of methyl chloroform, ethylene dichloride and 1,4-dioxane was vaporized and carried by a stream of helium at the rate of 50 cubic centimeters per minute and at the temperature of 110° C. through a copper gaseous phase chromatography column, ten feet high with a ¼″ outside diameter, packed with 30–60 mesh diatomaceous earth having 40 percent by weight of bis(α-(2-methoxyethoxy)-p-tolyl) ether impregnated therein. To determine and record the results obtained, the effluent gas from said column was passed through a thermoconductivity cell operating at a filament current of 150 milliamperes and equipped with a 0–10 millivolt recording potentiometer recording at the rate of 8 inches per hour in the manner reported at pp. 111–140 of "Proceedings, 1959, Second Biannual International Gas Chromatography Symposium." Separation of said mixture was effected in a manner superior to that attainable by known partitioning agents.

In a manner similar to the foregoing Example 3, mixtures of other chlorinated hydrocarbons such as chloroform, carbon tetrachloride and the like, as well as mixtures containing polar compounds were partitioned with the reaction products described and claimed herein. Such partitioning was high successful with both packed column and capillary techniques.

Various modifications may be made in the present invention without departing from the spirit or scope thereof and it is to be understood that I limit myself only as defined in the appended claims.

I claim:
1. A composition having the general formula:

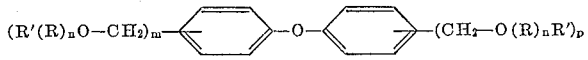

wherein R is an oxyalkylene structure having from two to four carbon atoms, R' is selected from the group consisting of the phenyl radicals and alkyl radicals having from one to four carbon atoms, $n$ is an integer from one to three, $m$ is an integer from one to two and $p$ is an integer from zero to two.

2. Bis($\alpha$-(2-(2-ethoxyethoxy)ethoxy)-p-tolyl) ether.
3. Bis($\alpha$-(2-(2-butoxyethoxy)ethoxy)-p-tolyl) ether.
4. Bis($\alpha$-(2-(2-methoxyethoxy)ethoxy)-p-tolyl) ether.
5. Bis($\alpha$-(2-methoxyethoxy)-p-tolyl) ether.
6. Bis($\alpha$-(2-butoxyethoxy)-p-tolyl) ether.
7. Bis($\alpha$-(2-phenoxyethoxy)-p-tolyl) ether.
8. Bis($\alpha$ - (methoxypropoxypropoxypropoxy) - p-tolyl) ether.

References Cited by the Examiner
UNITED STATES PATENTS
2,396,893   3/1946   Simons _____ 260—613

LEON ZITVER, *Primary Examiner.*

CHARLES B. PARKER, *Examiner.*

B. HELFIN, *Assistant Examiner.*